US010375877B2

(12) United States Patent
Behr

(10) Patent No.: US 10,375,877 B2
(45) Date of Patent: Aug. 13, 2019

(54) ELECTRIC HANDHELD BROADCAST SPREADER WITH PATTERN AND SPEED CONTROLLING BAFFLED SKIRT

(71) Applicant: Laurence D. Behr, Buffalo, NY (US)

(72) Inventor: Laurence D. Behr, Buffalo, NY (US)

( * ) Notice: Subject to any disclaimer, the term of this patent is extended or adjusted under 35 U.S.C. 154(b) by 25 days.

(21) Appl. No.: 15/891,050

(22) Filed: Feb. 7, 2018

(65) Prior Publication Data

US 2018/0220581 A1 Aug. 9, 2018

Related U.S. Application Data

(60) Provisional application No. 62/499,866, filed on Feb. 7, 2017.

(51) Int. Cl.
| | |
|---|---|
| *A01C 7/02* | (2006.01) |
| *A01C 15/02* | (2006.01) |
| *E01C 19/20* | (2006.01) |
| *A01C 17/00* | (2006.01) |

(52) U.S. Cl.
CPC .............. *A01C 17/008* (2013.01); *A01C 7/02* (2013.01); *A01C 15/02* (2013.01); *A01C 17/001* (2013.01); *E01C 2019/206* (2013.01)

(58) Field of Classification Search
CPC ......... A01C 7/02; A01C 15/02; A01C 17/001; A01C 17/006; A01C 17/008; E01C 2019/206

See application file for complete search history.

(56) References Cited

U.S. PATENT DOCUMENTS

| | | | | |
|---|---|---|---|---|
| 1,314,546 | A * | 9/1919 | Stratton ................... | A01C 7/02 111/130 |
| 1,802,059 | A * | 4/1931 | Maciejski .............. | A01C 15/02 111/130 |
| 1,868,025 | A * | 7/1932 | Ravencroft ............ | A01C 15/02 239/689 |
| 1,989,222 | A * | 1/1935 | Acer ...................... | A01C 15/02 111/200 |
| 4,485,973 | A * | 12/1984 | Ricciardi .................. | B29B 7/60 239/659 |

(Continued)

*Primary Examiner* — Darren W Gorman
(74) *Attorney, Agent, or Firm* — Vincent G. LoTempio; Kloss, Stenger & LoTempio; David T. Stephenson

(57) ABSTRACT

An electric handheld broadcast spreader with pattern and speed controlling baffled skirt detachably attaches to a conventional spreader mechanism to disperse particles in a controlled, directional manner within a proximal coverage area with two hands. A broadcasting/dispersing skirt receives particulate material from a conventional spreader. The inner volume of broadcasting/dispersing skirt comprises upper layer baffles, with upper gaps forming between each upper layer baffle; lower layer baffles, offset from the upper layer baffles, with lower gaps forming between each lower layer baffle; and multiple vertical deflector vanes disposed perpendicular to lower layer baffles. Discharged particulate material strikes the surface of the baffles, before passing through gaps. The particulate material traveling in a lateral direction strikes the deflector vanes and outlet edge of broadcasting/dispersing skirt. This controls velocity and direction of dispersed particulate material, causing particulate material to be confined within a close pattern coverage area on ground surface.

20 Claims, 9 Drawing Sheets

(56) References Cited

U.S. PATENT DOCUMENTS

| | | | | |
|---|---|---|---|---|
| 4,945,859 A | * | 8/1990 | Churchwell | A01K 5/0275 119/54 |
| 6,454,143 B1 | * | 9/2002 | Young | A01C 15/005 222/412 |
| 9,380,740 B2 | | 7/2016 | Myers | |

* cited by examiner

ELECTRIC HANDHELD BROADCAST SPREADER WITH PATTERN AND SPEED CONTROLLING BAFFLED SKIRT

FIELD OF THE INVENTION

The present invention relates generally to an electric handheld broadcast spreader with pattern and speed controlling baffled skirt. More so, the present invention relates to a particulate material broadcasting skirt and baffle system that detachably attaches to a motorized broadcasting mechanism to slow the speed of particulate material and eject the particulates in a controlled manner within a close, proximal coverage area while being manipulated with two hands; whereby the system includes a particulate material storage hopper attached to an electric motor-driven conventional spreader that forcibly discharges particulate material, and a diffuser skirt that receives the particulate material for broadcasting in a close pattern coverage area on the ground surface; whereby the inner volume of the diffuser skirt comprises multiple upper layer baffles traversing an upper region of the broadcasting/dispersing skirt, with gaps between each upper layer baffle; multiple lower layer baffles traversing a lower region of the broadcasting/dispersing skirt, parallel to and offset from the upper layer baffles, with gaps between each lower layer baffle; and multiple deflector vanes disposed beneath, and perpendicular to the lower layer baffles; whereby discharged particulate material strikes the surfaces of the baffles and passes through the gaps; whereby particulate material traveling through the diffuser skirt strikes the deflector vanes and the outlet edge, so as to control the speed and the direction of the particulate material, thereby causing the particulate material to be broadcast within a close pattern coverage area on the ground surface, such as within the boundaries of a sidewalk, away from the feet of an operator, and to strike the ground surface at low velocity further reducing scatter and "bounce," of particulate material in the case of hard ground surfaces.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known that homeowners and owners of commercial properties need to disperse an assortment of particulate or granular items or materials such as grass seed, snow and ice melting products such as rock salt and calcium chloride, lawn care products such as fertilizer and weed control product, and other such materials during the course of care and upkeep of property. Typically, a property owner will use a walk-behind, wheeled mechanical device for dispersing these substances. There exist two basic types of walk-behind spreaders, (1), so-called "drop" spreaders that disperse product only directly below a material storage hopper and between the wheels; and, (2), broadcast spreaders, which fling product outward in a wide pattern from below the hopper.

Drawbacks of both types of walk-behind spreaders include that they are often heavy and/or cumbersome, and are hard to store; are often subject to mechanical wear and malfunction are difficult or impossible to use on uneven surfaces and in tight or confined areas; and, are useless for treating ice on stairs, steps and door stoops.

The broadcast variety is unusable to de-ice sidewalks and paths because the product would be flung also onto lawns, causing damage, or into streets, causing waste. The uncontrolled pattern of the broadcast spreaders makes it hard to fertilize and "weed control" lawns without either excessive or inadequate overlap of multiple "passes," or possibly casting product where it may cause harm (e.g., flowerbeds). Drop spreaders are commonly used to de-ice sidewalks and paths because they closely confine the pattern of dispersal to the width of the device, but in use such machines often prove to be rife with mechanical and functional issues. In addition on icy sidewalks or paths their wheels may not have sufficient traction to drive the dispersing mechanism.

Presently available handheld broadcast spreaders, both electric and hand-cranked, like walk-behind broadcast spreaders, are useless for icy sidewalks and paths because they overspray onto lawns and into streets, etc. Both varieties of broadcast spreaders, handheld and walk-behind, have also the above-noted drawbacks when used for fertilizing and weed control products: the difficulties of achieving even and uniform distribution, and avoiding overspray onto undesirable surfaces. For ice treatment on sidewalks, paths and driveways many homeowners use shaker bottles, which, although cheap and convenient, can easily produce very uneven results.

Even though the above cited dispersion mechanisms meet some of the needs of the market, a hand-held particulate material broadcasting/dispersing skirt and baffle system that detachably attaches to an electric broadcasting mechanism to disperse particles in a controlled, uniform, directional manner within a proximal coverage area while being manipulated with two hands, is desired as a solution suitable for both homeowner and commercial applications.

SUMMARY

Illustrative embodiments of the disclosure are generally directed to an electric handheld broadcast spreader with pattern and speed controlling baffled skirt. The broadcast spreader with pattern and speed controlling baffled skirt is configured to detachably attach to a broadcasting mechanism that forcibly discharges particulate material, and a conventional spreader that is in communication with a broadcasting/dispersing skirt to receive particulate material. The broadcasting/dispersing skirt includes two layers of baffles, vertical deflector vanes, and a peripheral region that are configured and positioned to control, both the velocity and direction, of particulate material being broadcast through an outlet aperture. This results in the particulate material dispersing within a proximal coverage area of a ground surface, such as within the boundaries of a sidewalk, and away from the feet of the operator.

In some embodiments, the broadcast spreader with pattern and speed controlling baffled skirt may include a dispersing skirt having a receiving inner volume and forming an inlet aperture that is sized and dimensioned to receive particulate material. The broadcasting/dispersing skirt may be detachably attached to a particle broadcasting mechanism that is configured to forcibly broadcast particulate material through the inlet aperture and into the receiving inner volume of the broadcasting/dispersing skirt. The storage hopper may have an inverted pyramidal shape that is configured to receive the particulate material from the forcible discharge of particulate material by the particulate broadcasting mechanism.

The broadcast spreader with pattern and speed controlling baffled skirt may also include a broadcasting/dispersing skirt that positions below the conventional spreader, and is in communication with the broadcasting mechanism. The broadcasting/dispersing skirt may have a generally pyramidal shape that is configured to receive the particulate material from the forcible discharge of particulate material by the particulate broadcasting mechanism of the conventional spreader. The broadcasting/dispersing skirt is defined by a dispersing inner volume forming an upper region and a lower region. The lower region terminates at an outlet edge that forms an outlet aperture, through which the particulate material is dispersed.

The inner volume of the broadcasting/dispersing skirt comprises multiple, elongated upper layer baffles traversing the upper region of the dispersing inner volume of the broadcasting/dispersing skirt. The upper layer baffles may include an inverse V-shape defined by an upper peak and an upper surface area. The upper layer baffles are disposed coplanar to each other. An upper gap forms between each upper layer baffle.

The broadcasting/dispersing skirt further comprises multiple, elongated lower layer baffles traversing the lower region of the dispersing inner volume of the broadcasting/dispersing skirt. The lower layer baffles may include an inverse V-shape defined by a lower peak and a lower surface area. The lower layer baffles are disposed coplanar to each other. A lower gap forms between each lower layer baffle. The lower layer baffles are also disposed below, and offset from the upper layer baffles. The broadcasting/dispersing skirt further comprises multiple vertical deflector vanes disposed beneath, and perpendicular to the lower layer baffles.

In operation, the particulate material introduced into the broadcasting/dispersing skirt strikes an upper peak and an upper surface area of the upper layer baffles, before passing through the upper gaps. After passing through the upper gaps, the particulate material strikes the lower peak and a lower surface area of the lower layer baffles, before passing through the lower gaps. After passing the lower gaps, the particulate material passes vertically between the vertical deflector vanes. Any particulate material traveling in a lateral direction through the broadcasting/dispersing skirt strikes the vertical deflector vanes and the outlet edge of the broadcasting/dispersing skirt, causing the particulate material to be confined within a close pattern coverage area on the ground surface.

Thus, the particulate material strikes the upper and lower layer baffles, the vertical deflector vanes, and the outlet edge of the broadcasting/dispersing skirt, causing a reduction in velocity and a generally vertical directional flow of the particulate material through the broadcasting/dispersing skirt. Further, the particulate material, and specifically any particulate material that may be traveling in a lateral direction, strikes the vertical deflector vanes and the outlet edge of the broadcasting/dispersing skirt to return to a vertical direction.

This, in turn, causes the particulate material to disperse within a proximal coverage area of a ground surface, such as within the boundaries of a sidewalk, and away from the feet of the operator. This velocity and directional control also minimizes bouncing of particulate material on the ground surface. Further, the system allows the coverage area of particulate material across the ground surface to be increased or decreased by raising and lowering the apparatus. Further, the discharge velocity of the particulate material is controlled through a velocity switch.

In another aspect, the broadcasting/dispersing skirt has a pyramidal shape.

In another aspect, the inlet aperture is sized and dimensioned to enable passage of a particulate material into the receiving inner volume.

In another aspect, the outlet aperture is sized and dimensioned to enable passage of the particulate material.

In another aspect, the upper layer baffles are defined by a V-shape having an upper peak and an upper surface area.

In another aspect, the lower layer baffles are defined by a V-shape having a lower peak and a lower surface area.

In another aspect, the particulate material introduced into the dispersing inner volume of the broadcasting/dispersing skirt strikes the upper peak and the upper surface area of the upper layer baffles, and further, the particulate material striking the upper peak and the upper surface area of the upper layer baffles passes through the upper gap.

In another aspect, the particulate material passing through the upper gap strikes the lower peak and a lower surface area of the lower layer baffles, and further, the particulate material striking the lower peak and the lower surface area of the lower layer baffles passes through the lower gap.

In another aspect, the particulate material passing through the lower gap strikes the vertical deflector vanes and the outlet edge of the broadcasting/dispersing skirt.

In another aspect, the particulate material striking the deflector vanes and the outlet edge disperses through the outlet aperture in a close pattern coverage area.

In another aspect, the particulate material includes at least one of the following: rock salt, ice melting particulates, an anti-slip agent, an absorbent particle, fertilizer, seeds, grains, and livestock feed.

In another aspect, the system further comprises a pair of handles joined with the conventional spreader.

In another aspect, the system further comprises a broadcasting mechanism operatively attached, and in communication with the broadcasting/dispersing skirt.

In another aspect, the broadcasting mechanism comprises a velocity switch, the velocity switch regulating discharge velocity of the particulate material.

In another aspect, the broadcasting mechanism includes at least one of the following: a blower, a rotating blade, an electrical motor, and a power supply.

One objective of the present invention is to provide a an electric handheld broadcast spreader with pattern and speed controlling baffled skirt that disperses particulate material in a closed pattern within a sidewalk border and away from an operator's feet.

Another objective is to reduce slippage on a sidewalk through hand-held dispersing of an anti-slip agent, such as rock salt, or fertilizer, or other particulate materials.

Yet another objective is to reduce the velocity and control the direction of the particulate material with a series of baffles, vertical deflector vanes, and a peripheral region that make up a broadcasting/dispersing skirt.

Yet another objective is to enabling an operator to evenly cover a ground surface with the particulate material.

Yet another objective is to increase and decrease the coverage area of the particulate material by lifting and lowering the skirt and baffle system.

Yet another objective is to directionally disperse particulate material away from the feet of an operator.

Yet another objective is to provide an inexpensive to manufacture hand-held particulate material dispersing skirt and baffle system.

Yet another objective is to provide an electric handheld broadcast spreader with pattern and speed controlling baffled skirt that spreads rock salt or ice melt pellets only on the sidewalk, and does so very quickly and conveniently.

Yet another objective is to provide a broadcasting/dispersing skirt that has interior baffles that slow down the product after it drops from the hopper onto the spinner, so that it will not scatter upon hitting an icy walk.

Yet another objective is to provide an electric handheld broadcast spreader with pattern and speed controlling baffled skirt helps protect homeowners, lessees, and commercial property owners from legal liability to persons slipping and falling on ice.

Yet another objective is to provide an electric handheld broadcast spreader with pattern and speed controlling baffled skirt that a user can easily match spread to the width of a sidewalk or path simply by holding the broadcasting/dispersing skirt slightly higher or lower; whereby the pair of handles make it easy to hold at the desired height. This can especially be effective for large areas such as driveways users can just tilt it outward and wave the spread from side-to-side, or they can quickly "walk" the driveway covering it in strips.

Yet another objective is to provide a frontal dial, or switch, that adjusts the conventional spreader's aperture to control flow volume from the storage hopper; whereby heavier flow may be desired when a depth of snow is present. The volume dial is calibrated to correspond to settings on spreaders currently sold for use with lawn care products.

Yet another objective is to provide a lidded storage hopper that holds a substantial amount of particulate material, potentially enabling multiple uses without refilling; whereby the lid protects the particulate material from precipitation, and from spillage.

Yet another objective is to provide a baffled broadcasting/dispersing skirt that shields the user's feet from product while ensuring that the surface on which the user walks is treated, thus protecting the user's own safety.

Yet another objective is to provide an electric handheld broadcast spreader with pattern and speed controlling baffled skirt that is equally useful in warm weather and regions to spread lawn-care products far more accurately than handheld or wheeled broadcasters, and faster and more conveniently than walk-behind "drop" spreaders.

Yet another objective is to provide a broadcasting/dispersing skirt that can be removed and the spreader then used to broadcast product, the same as currently sold handhelds, if desired.

Yet another objective is to provide a power source having a long-life, rechargeable lithium ion battery. However, in some embodiments, four AA batteries can be substituted.

In conclusion the handheld spreader of particles such as rock salt or other ice-melting pellets, designed to allow the user to substantially confine the spread of ice melting particles to sidewalks and walkways, but also useable for wider broadcasting of such substances. It has many other potential uses for a wide range of applications, including with other substances such as fertilizers and other lawn and garden products. It has distinct advantages over existing handheld spreaders in that such products do not provide for significant confinement of the distributed substances, laterally or forward, whereas this invention does both.

Further, unlike this invention, which drops pellets and rock salt in a gentle shower within a tightly controlled pattern (if desired), existing handheld spreaders fail to reduce the velocity and force with which hard, pelletized substances, such as rock salt and calcium chloride, strike hard surfaces such as ice, concrete and asphalt, with the resulting bounce and travel making the spread of such substance onto lawns, etc., uncontrollable.

Further, unlike this invention, existing handheld spreaders are not held by both hands, and thus do not allow the user, (A), to easily raise and lower the spreader so as to adjust the scope of the broadcast; nor (B), to control both rate of flow, and operation of the motor, without moving either of his or her hands.

Further, unlike existing handheld spreaders, this invention, due to its unique design, is capable of storing, safely and securely, a substantial amount of product in its hopper/reservoir, enabling busy homeowners, etc., to quickly pick it up, already loaded, and rapidly spread ice melt on their walks and drives in the morning or upon arrival home at night.

Further, unlike most existing handheld spreaders, this invention shields the feet of the user from its broadcast while also ensuring that the user walks forward safely upon a dangerous surface, i.e., slick ice, that has been amply treated directly in front of him or her.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 3A shows a perspective view of an alternative bell-shaped broadcasting/dispersing skirt, and FIG. 3B illustrates a sectioned view of half a storage hopper and adjacent broadcasting/dispersing skirt, in accordance with an embodiment of the present invention;

Like reference numerals refer to like parts throughout the various views of the drawings.

DETAILED DESCRIPTION OF THE INVENTION

Figure 1:
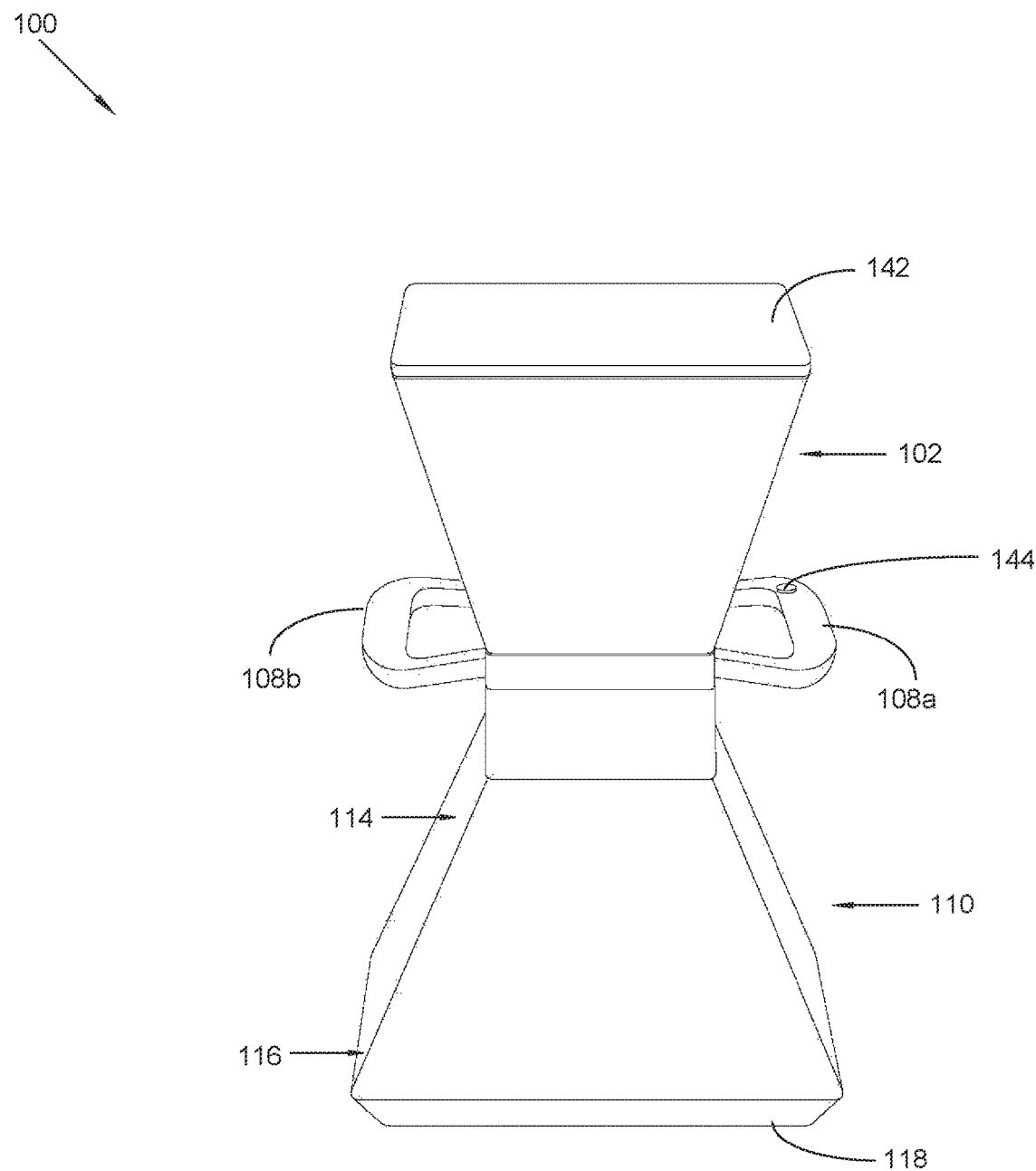
FIG. 1 illustrates a front perspective view of an exemplary hand-held particulate material dispersing skirt and baffle system, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An electric handheld broadcast spreader 100 with pattern and speed controlling baffled skirt is referenced in FIGS. 1-9. Broadcast spreader 100 is a unique hand-held disperser that efficiently disperses on a sidewalk, or any ground surface 202, a particulate material 200, including, but without limitation, rock salt, ice melting particulates, an anti-slip agent, an absorbent particle, fertilizer, seeds, grains, and livestock feed. Further, the term "particulate material 200" herein the specification and claims denotes a bulk of particles in their broadest meaning including powders, granular material 200, an anti-slip agent, seeds, pellets and the like, which can include, for example, fertilizer, pesticides, chemicals, insecticides, weed killers, herbicides, ice salt, calcium chloride, etc.

Broadcast spreader 100 is effective for controlling the velocity and direction of the dispersed particulate material 200 through use of a broadcasting/dispersing skirt 110 containing within its inner volume 112: upper layer baffles 122a-d, lower layer baffles 130a-d, vertical deflector vanes 138a-d, and an outlet edge 118 forming at broadcasting/dispersing skirt 110. These mechanical barriers are configured to reduce the velocity of the particulate material 200, and also control the direction of particulate material 200 in a generally vertical, downward direction across inner volume 112 of broadcasting/dispersing skirt 110. This directional control minimizes lateral dispersion and bouncing of particulate material 200 off the ground surface 202. Consequently, particulate material 200 disperses within a proximal coverage area 204 of an operator 208, such as within the boundaries of a sidewalk, walkway, driveway, or roadway. The velocity and direction of particulate material 200 is also controlled, so as to be directed away from the feet of the operator 208.

As referenced in FIG. 1, broadcast spreader 100 comprises storage hopper 102, which 102 may include a gate which blocks the communication with broadcasting/dispersing skirt 110 when broadcast spreader 100 is not in use, so as to preclude unwanted dispersing of particulate material 200. Storage hopper 102 may be powered by a motor and an electrical power source, such as a battery. In one embodiment, the power source has a long-life, rechargeable lithium ion battery. However, in some embodiments, four AA batteries can be substituted. Though in other embodiments, other types of power sources may be used.

In some embodiments, storage hopper 102 may include, without limitation, a blower, an aggregate spinner, or a rotating blade that forcibly discharges particulate material 200. In other embodiments, storage hopper 102 may include rotating blades, which may be carried on a disc, a blower, a rotating or spinning blade, or any other impeller or rock salt dispenser known in the art.

In some embodiments, the speed of the motor may be adjusted, for example, controllable by settings associated with a power button/velocity switch 144, which may be accessible by at least one finger of an operator's 208 hand holding the storage hopper 102 by a pair of handles 108a, 108b. The motor can be adapted to provide different rotational speeds to the dispersing arrangement thereby controlling the area which the dispersed material 200 covers. For this purpose, the velocity switch 144 can have associated therewith indicia and means for dictating different power levels (e.g. low, medium and high). In other embodiments, broadcast spreader 100 utilizes a volume dial 146 to control the amount of particulate material that is emitted from the storage hopper into the broadcasting/dispersing skirt. The volume dial is calibrated to correspond to settings on currently available spreaders for lawn care products.

Figure 2:
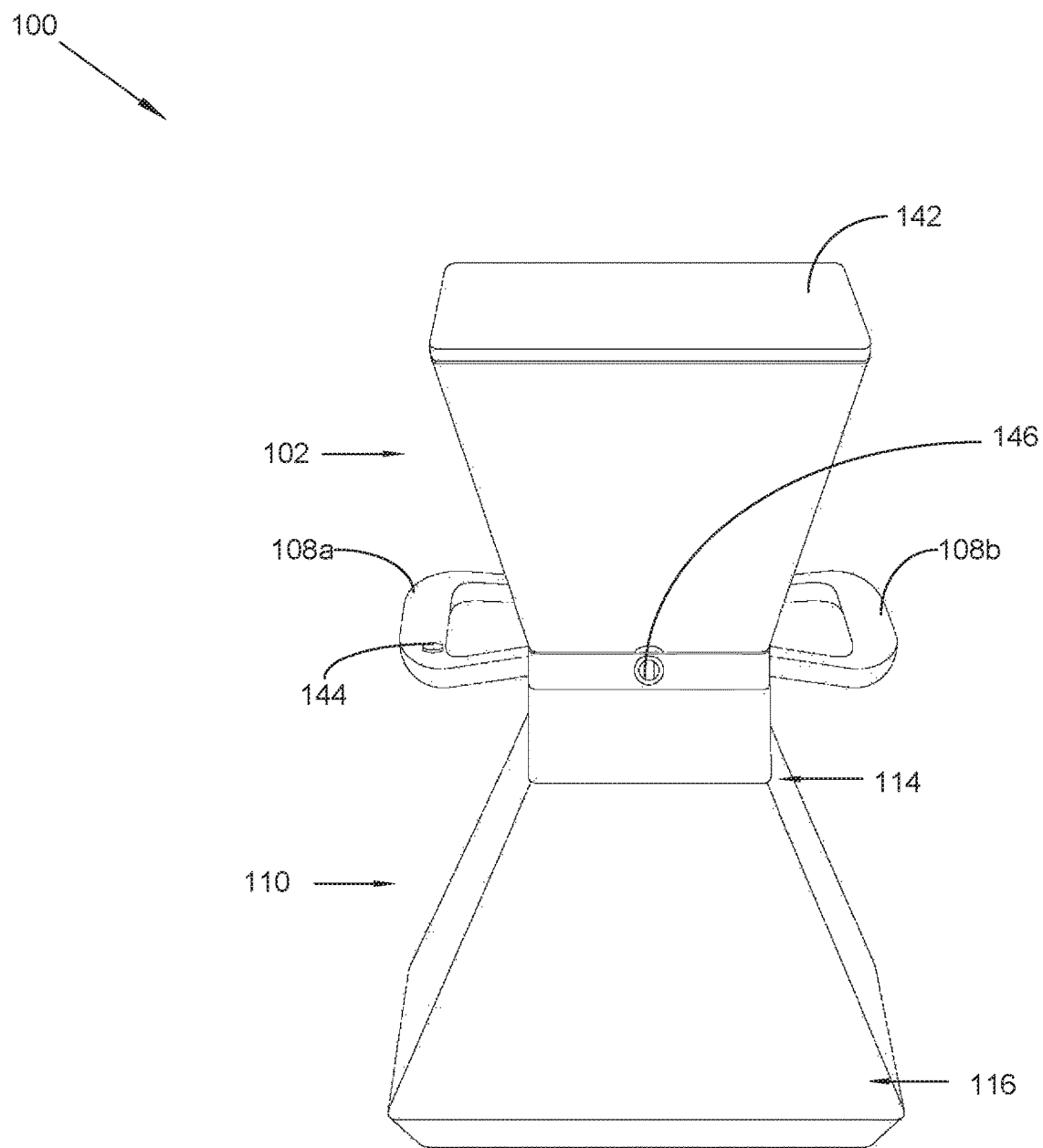
FIG. 2 illustrates a rear perspective view of the hand-held particulate material dispersing skirt and baffle system shown in FIG. 1, in accordance with an embodiment of the present invention.

Turning now to FIG. 2, the storage hopper 102 is configured to receive particulate material 200. Storage hopper 102 may be configured to have a generally inverted pyramidal shape, with a wide end oriented upwardly, and a narrow end oriented downwardly towards a ground surface 202. Storage hopper 102 is defined by a receiving inner volume 104 that is sufficiently sized to store and dispense the particulate material 200 from broadcasting mechanism.

In one embodiment, storage hopper 102 forms an inlet aperture 106 that is sized and dimensioned to receive particulate material 200. As FIGS. 1 and 2 illustrate, a lid 142 may be used to removably cover inlet aperture. In one non-limiting embodiment, the storage hopper 102 holds a substantial amount of particulate material, potentially enabling multiple uses without refilling. A lid covers the opening in the storage hopper 102 to protect the particulate material 200 from precipitation, and from spillage.

In one non-limiting embodiment, storage hopper 102 is designed to conveniently hold particulate material 200 to feed to the dispersing arrangement via inlet aperture 106 located at the top of storage hopper 102. In another embodiment, storage hopper 102 may include a selector for adjusting the opening size of inlet aperture 106, and thus for adjusting the dispersing rate. The selector may include indicia to indicate at least the relative size of the opening of inlet aperture 106 and thus the dispersing rate of particulate material 200.

In other embodiments, a pair of handles 108*a*, 108*b* extend from the outer surface of the storage hopper 102. Pair of handles 108*a*, 108*b* enable two-handed grasping and manipulation of broadcast spreader 100. This enables an operator 208 to raise the broadcast spreader 100, so as to increase the coverage pattern of particulate material 200 on the ground surface 202; and lower the broadcast spreader 100, so as to decrease the coverage pattern of particulate material 200 on ground surface 202.

In other embodiments, the handles 108*a*, 108*b* comprise a tilting and/or angling and/or swivel mechanism whereby the handle is tiltable and/or can be angled and/or can be swiveled with respect to the hopper.

In its operative position, the handles 108*a*, 108*b* are typically positioned directly and centrally below the storage hopper 102 whereby the center of gravity of the broadcasting/dispersing skirt 110 (particularly when it is loaded with particulate material 200) is below the handle—meaning below the typical location of the hand of an operator 208 that is gripping the handles 108*a*, 108*b*.

Figure 4:
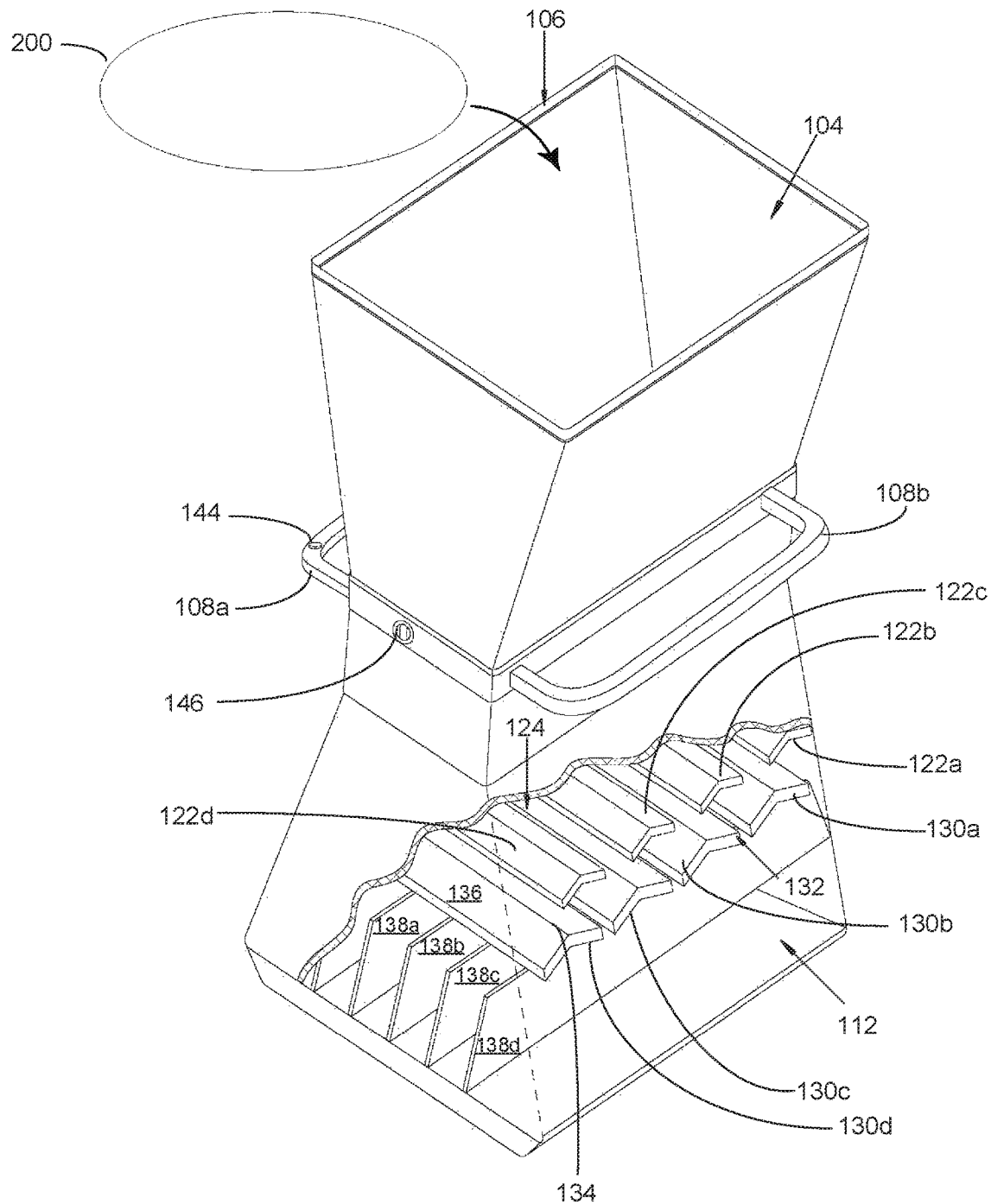
FIG. 4 illustrates a sectioned perspective view of the dispersing skirt and baffle system, showing upper layer baffles, lower layer baffles, and vertical deflector vanes, in accordance with an embodiment of the present invention.

Turning now to FIG. 4, broadcast spreader 100 also includes a broadcasting/dispersing skirt 110 adjacent to the storage hopper 102, and in communication with the broadcasting mechanism. Broadcasting/dispersing skirt 110 is attached below storage hopper 102, such that broadcasting/dispersing skirt 110 is oriented proximal to the ground surface 202, and storage hopper 102 is distally located from the ground surface 202.

In one embodiment, broadcasting/dispersing skirt 110 may have a generally pyramidal shape that receives particulate material 200 from forcible discharge of particulate material 200 by the particulate broadcasting mechanism. Though in other embodiments, broadcasting/dispersing skirt 110 the particulate material 200 is fed into broadcasting/dispersing skirt 110 from the storage hopper 102.

In one embodiment, broadcasting/dispersing skirt 110 is defined by a dispersing inner volume 112 forming an upper region 114 and a lower region 116. The lower region 116 terminates at an outlet edge 118 that forms an outlet aperture 120, through which the particulate material 200 is dispersed. Outlet edge 118 may be shaped with a flange, or a slightly sloped configuration that prevents particulate material 200 from being dispensed outside the closed pattern, and retains particulate material 200 in a more vertical direction while being dispensed through outlet aperture 120.

Figure 3A:
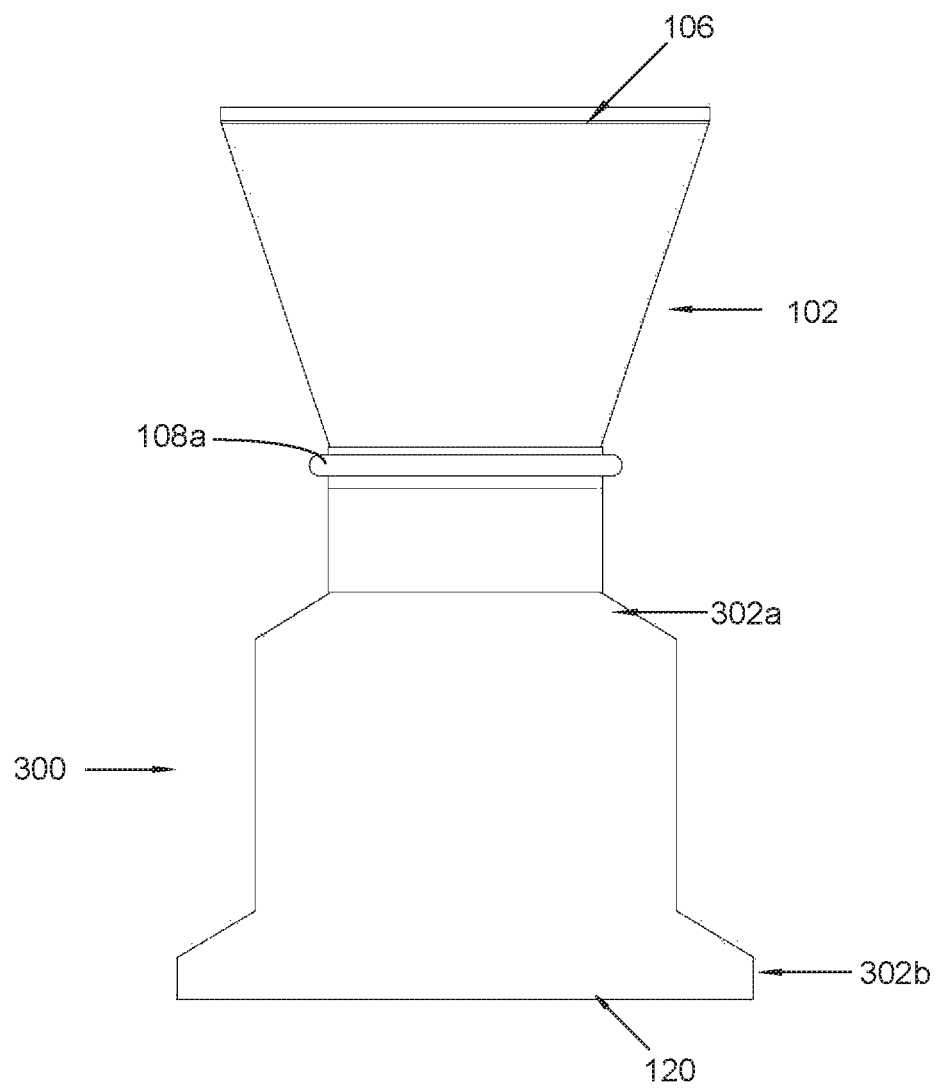
FIGS. 3A and 3B illustrate views of a hand-held particulate material dispersing skirt and baffle system, where

In one alternative embodiment shown in FIG. 3A, the broadcast spreader 100 utilizes a bell-shaped broadcasting/dispersing skirt 300 defined by an upper narrow end 302*a* and a lower wide end 302*b* terminates at an outlet edge 118 that forms an outlet aperture 120, through which the particulate material 200 is dispersed. In yet other embodiments, other shapes and dimensions may be used for the broadcasting/dispersing skirt 110, with the primary objective of controlling the velocity and direction of the particulate material dispersing therefrom.

Figure 3B:
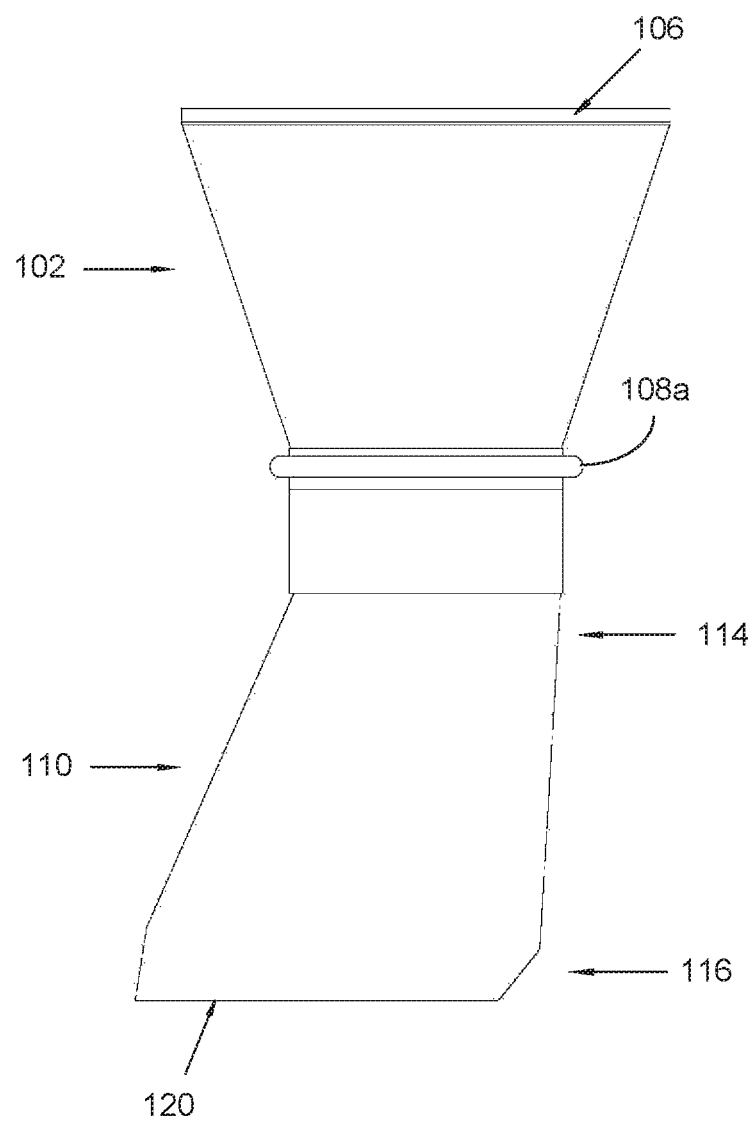

In any case, a sectioned illustration of the broadcasting/dispersing skirt 110 shows that the configuration is generally narrow at the upper region 114, and wider at the lower region 116 (FIG. 3B). This tapered shape for either the pyramidal shaped broadcasting/dispersing skirt 110 or bell-shaped broadcasting/dispersing skirt 300 is effective for allowing the particulate material 200 to flow freely out of the outlet aperture 120, and providing a larger surface area for the outlet edge 118 to control particulate material discharge, as described below.

The sectioned view of FIG. 4 illustrates that broadcasting/dispersing skirt 110 comprises multiple, elongated upper layer baffles 122*a-d* traversing the upper region 114 in the dispersing inner volume 112 of broadcasting/dispersing skirt 110. In one non-limiting embodiment, upper layer baffles 122*a-d* are slanted towards the operator 208. In one embodiment, four upper layer baffles 122*a*, 122*b*, 122*c*, 122*d* are used in a parallel, coplanar arrangement.

Figure 6:
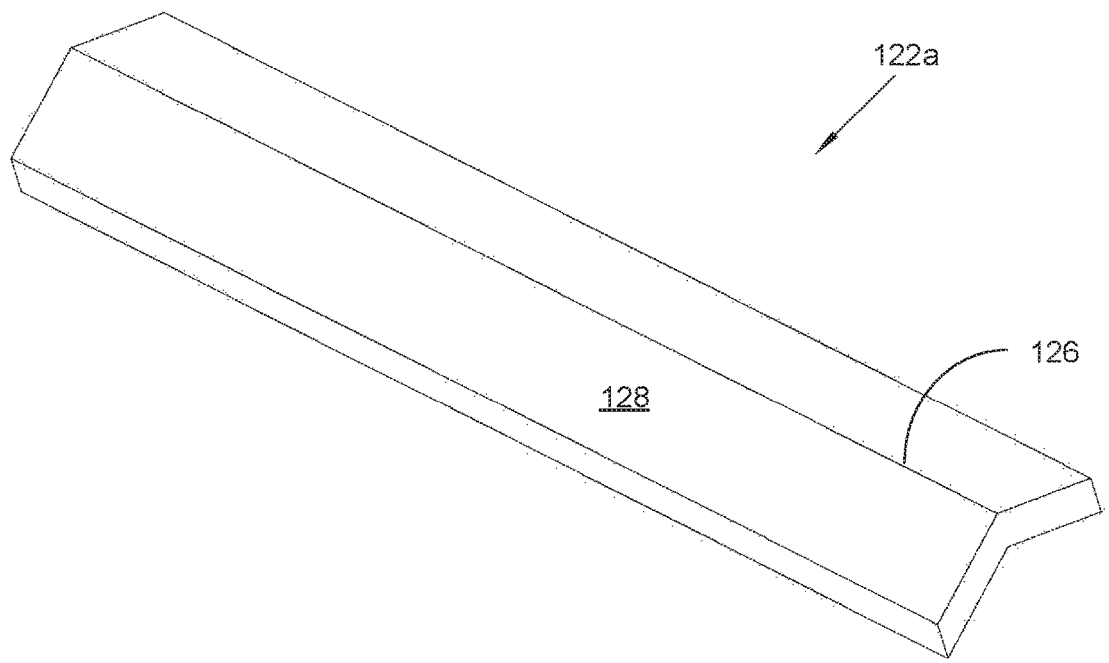
FIG. 6 illustrates a perspective view of a V-shaped, elongated upper baffle, in accordance with an embodiment of the present invention.
Figure 7:
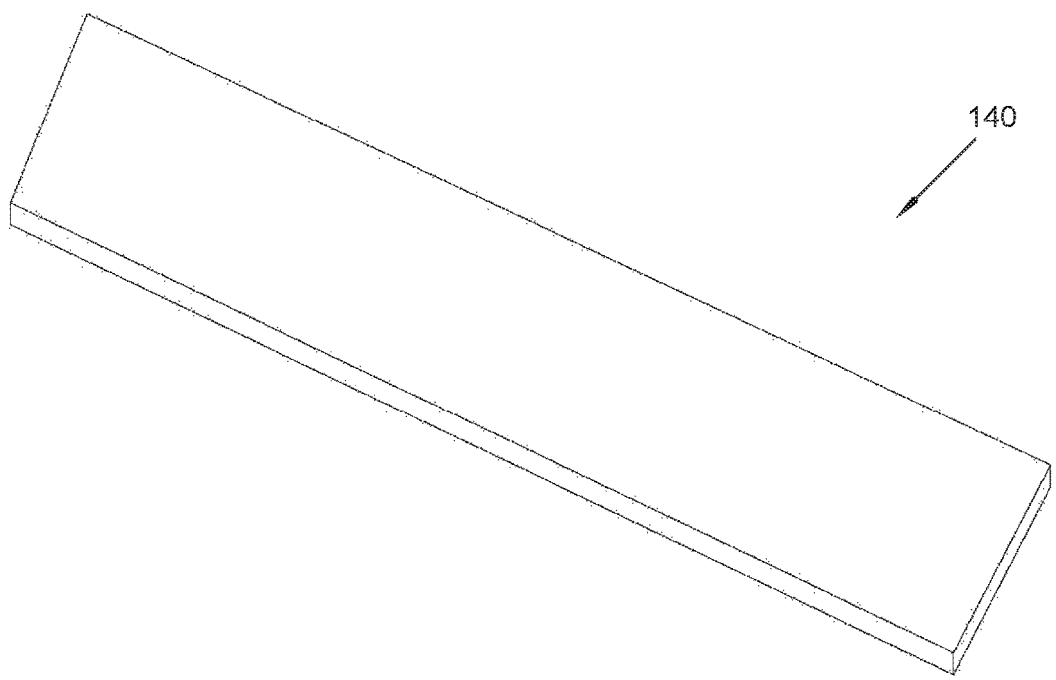
FIG. 7 illustrates a perspective view of a flat, elongated upper baffle, in accordance with an embodiment of the present invention.

Looking at the upper layer baffles 122*a-d* in FIG. 6, an inverse V-shape is followed. The inverse V-shape is defined by an upper peak 126 and an upper surface area 128. Particulate material initially strikes upper peak 126 and slides down upper surface area 128 before passing through upper gap 124. In one embodiment, upper layer baffles 122*a-d* are disposed coplanar to each other, with an upper gap 124 forming between each upper layer baffle 122*a-d*. However, as shown in FIG. 7, an alternative series of upper layer baffles 140 are generally flat. In this flat configuration, gap 124 still forms between each flat upper layer baffle 140.

In one non-limiting embodiment, upper layer baffles 122*a-d* are angled between 60° and 110°. At this range of angles, the speed of particulate material 200 may have to be slowed; but the downward trajectory is nonetheless, maintained. In another embodiment, the width of upper layer baffles 122*a-d* can be between 0.75" and 1.5". In yet another embodiment, the spacing between each upper layer baffle 122*a-d* is about 75% of the baffles width.

Figure 5:
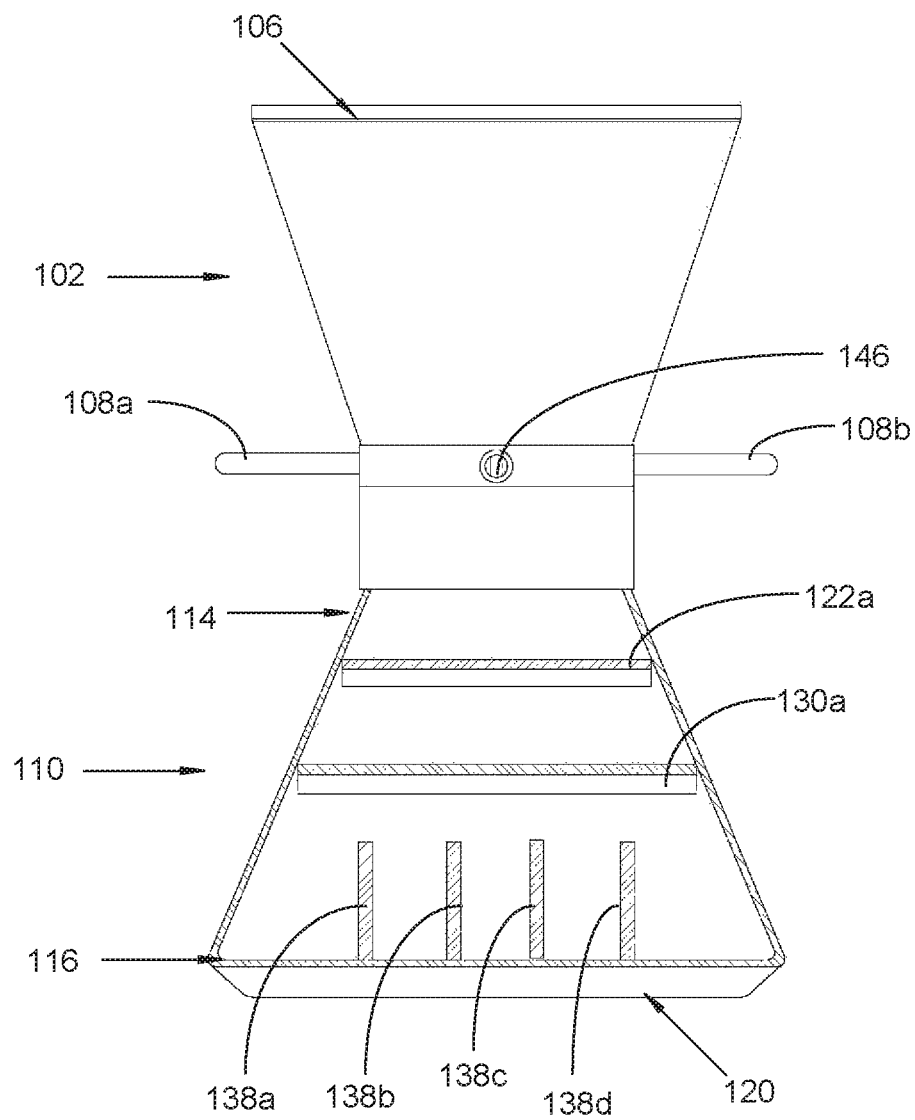
FIG. 5 illustrates a sectioned side view of the broadcasting/dispersing skirt of and baffle system, showing upper layer baffles, lower layer baffles, and vertical deflector vanes, in accordance with an embodiment of the present invention.

Looking at FIG. 5, broadcasting/dispersing skirt 110 further comprises multiple, elongated lower layer baffles 130*a-d* that are disposed to traverse the lower region 116 of the dispersing inner volume 112 of broadcasting/dispersing skirt 110. In one non-limiting embodiment, lower layer baffles 130*a-d* are slanted away from the operator 208. In one embodiment, four lower layer baffles 130*a*, 130*b*, 130*c*, 130*d* are used in a parallel, coplanar arrangement.

In one non-limiting embodiment, lower layer baffles 130*a-d* are angled between 60° and 110°. At this range of angles, the speed of particulate material 200 may be slowed; but the downward trajectory is nonetheless, maintained. In another embodiment, the width of lower layer baffles 130*a-d* can be between 0.75" and 1.5". In yet another embodiment, the spacing between each lower layer baffle 130*a-d* is about 75% of the baffles width. Further, the lower layer baffles 130*a-d* must be deep enough inside the broadcasting/dispersing skirt 110 that its sides will be struck by particles and, together with the vertical deflector vanes 138*a-d* at the bottom of the skirt confine their path, probably about 1.5 inches inside.

In yet another embodiment, lower layer baffles 130*a-d* may include an inverse V-shape defined by a lower peak 134 and a lower surface area 136. Lower layer baffles 130*a-d* are disposed coplanar to each other, with a lower gap 132 forming between each lower layer baffle 130*a-d*. However, in alternative embodiments, lower layer baffles are generally flat. In this flat configuration, lower gap 132 still forms between each flat lower layer baffle.

Figure 9:
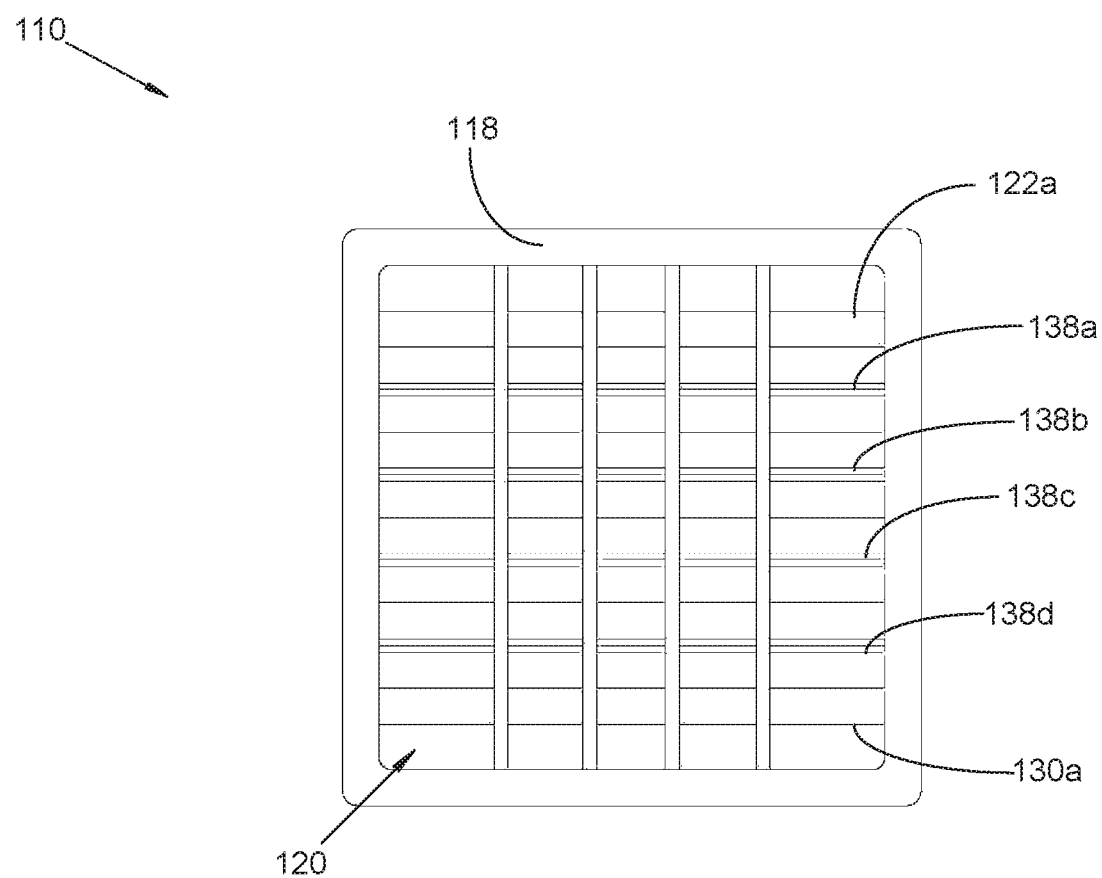
FIG. 9 illustrates a bottom view of an exemplary broadcasting/dispersing skirt, showing upper layer baffles, lower layer baffles, and vertical deflector vanes, in accordance with an embodiment of the present invention.

Further, lower layer baffles 130*a-d* are also disposed below, and offset from upper layer baffles 122*a-d*. Broadcasting/dispersing skirt 110 further comprises multiple vertical deflector vanes 138*a-d* disposed beneath, and perpendicular to the lower layer baffles 130*a-d*. Vertical deflector vanes 138*a-d* are effective to maintain particulate material in a generally vertical dispersion pattern, so as to minimize lateral dispersion. In one embodiment, four vertical deflector vanes 138*a*, 138*b*, 138*c*, 138*d* are used in parallel. Thus, as the bottom view of broadcasting/dispersing skirt 110 in FIG. 9 shows, the upper layer baffles 122*a-d*, lower layer baffles 130*a-d*, and deflector vanes 138*a-d* form an interlacing series of barriers that reduce the velocity and regulate the flow of the particulate material 200 in a more vertical direction.

Figure 8:
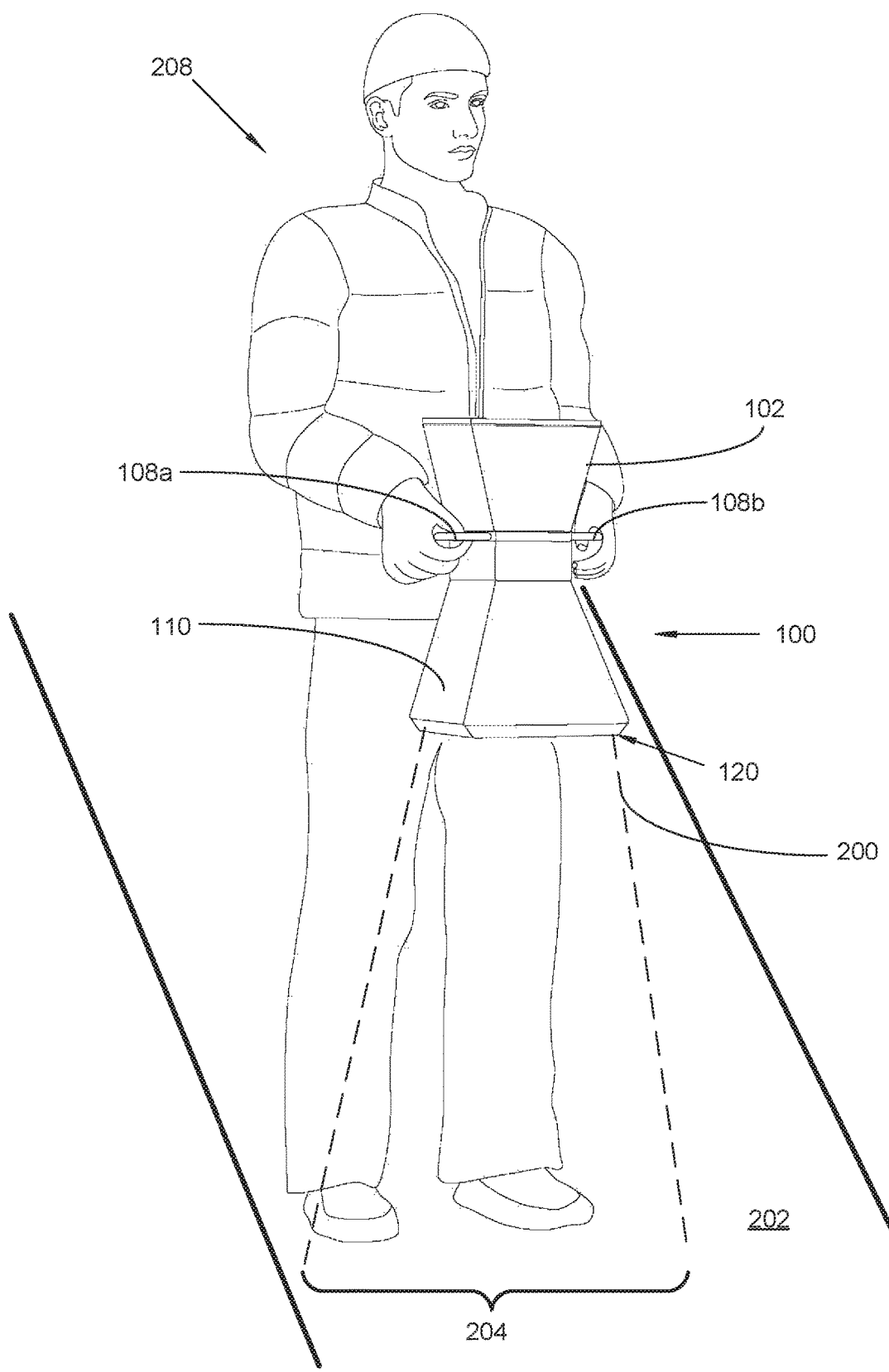
FIG. 8 illustrates a perspective view of an operator dispersing particulate material in a closed pattern coverage area on a sidewalk, in accordance with an embodiment of the present invention.

Looking now at FIG. 8, in operation, the particulate material 200 introduced into the dispersing inner volume 112 of broadcasting/dispersing skirt 110 strikes upper peak 126 and upper surface area 128 of upper layer baffles 122a-d, before passing through upper gap 124. After passing through upper gap 124, the particulate material 200 strikes lower peak 134 and lower surface area 136 of lower layer baffles 130a-d, before passing through lower gap 132 that forms between each lower layer baffle 130a-d.

After passing through lower gap 132, particulate material 200 disperses vertically between the vertical deflector vanes 138*a-d* and through outlet aperture 120. However, any particulate material 200 traveling in a lateral direction strikes deflector vanes 138*a-d* and outlet edge 118 of broadcasting/dispersing skirt 110. This causes particulate material 200 to be confined within a close pattern coverage area 204 on the ground surface 202 that is being treated, i.e., within boundaries of sidewalk, and away from feet of operator 208.

Thus, particulate material 200 strikes the upper and lower layer baffles, the vertical deflector vanes 138*a-d*, and the terminal edge of the broadcasting/dispersing skirt for a reduction in velocity through the broadcasting/dispersing skirt. Further, particulate material 200, and specifically particulate material 200 traveling in a lateral direction, strikes vertical deflector vanes 138*a-d* and outlet edge 118 of the broadcasting/dispersing skirt 110 to control the direction of particulate material 200.

As a resultant of the aforementioned baffles 122*a-d*, deflector vanes 138*a-d*, and outlet edge 118 forming in the broadcasting/dispersing skirt 110, provide uniquely configured barriers that control the velocity and directional control of particulate material 200, so as to minimize lateral dispersing of particulate material 200, and bouncing of particulate material 200 from the ground surface 202. Further, the dispersing pattern and coverage area 204 of particulate material 200 across the ground surface 202 is increased or decreased by raising and lowering the broadcasting/dispersing skirt 110 in relation to the ground surface 202.

For example, an operator 208 may walk along a sidewalk with the broadcasting/dispersing skirt 110 being held 60" above the ground surface 202. The broadcasting mechanism forces particulate material 200 through the outlet aperture 120 of the broadcasting/dispersing skirt 110. The operator 208 raises the broadcast spreader 100 to increase the range of area of particulate material 200. FIG. 8 shows particulate material 200 dispersed within the boundaries of a sidewalk.

In some embodiments, broadcast spreader 100 enables a user to easily match spread to the width of a sidewalk or path simply by holding the broadcasting/dispersing skirt 110 slightly higher or lower; whereby the pair of handles 108*a-b* make it easy to hold at the desired height. This capacity to manipulate the broadcasting/dispersing skirt 110 in such a manner can especially be effective for large areas such as driveways users can just tilt it outward and wave the spread from side-to-side, or they can quickly "walk" the driveway covering it in strips.

However, since the baffles 122*a-d*, deflector vanes 138*a-d*, and outlet edge 118 substantially maintain the particulate material 200 in a vertical dispersion pattern, the particulate material 200 does not exceed the boundaries of the sidewalk, or strike the feet of the operator 208. Further, if a closer pattern of particulate material 200 inside the sidewalk is required, the operator 208 may lower the broadcasting/dispersing skirt 110 closer to the ground surface 202. The velocity switch 144 may also be adjusted to control the pattern of particulate material 200 inside the sidewalk.

In addition to rock salt, broadcast spreader 100 helps solve serious problems for applying lawn care products, such as fertilizer and weed control material. Broadcast spreader 100, both handheld and wheeled, distribute lawn products over large areas quickly, but at the expense of control. Without proper attention and technique, broadcast spreaders will scatter material onto a neighbor's lawn, a flowerbed, or the street. Also, the farther away from the spreader the material travels, the lighter the coverage, so one must overlap passes to spread the product evenly—which is challenging at best and impossible where one's lawn adjoins a neighbor's.

Those skilled in the art will recognize that walk-behind "drop" spreaders solve these problems with broadcasters, but again, they are clumsy, inconvenient, slow, and hard to store. This, spreader; and specifically the baffled broadcasting/dispersing skirt, 110 resolves many of these oft-noted problems with using broadcast and "drop" spreaders for lawn care products; thereby providing unprecedented ease of use, convenience, speed and accuracy.

In conclusion, broadcast spreader 100 is an innovative, unique, battery-powered (alkaline or rechargeable) handheld spreader for rock salt or ice melting pellets, with both commercial and residential applications. Unlike all other handheld spreaders, this broadcast spreader 100 works to broadcast particulate material 200 through multiple layers of baffles and vanes in a broadcasting/dispersing skirt 110 so that the particulate material 200 drops down in a gentle shower confined, if one so desires, to a sidewalk or walkway. This broadcast spreader 100, thus combines the ease and speed of a conventional handheld broadcaster, with the accuracy of a walk-behind "drop" spreader. In warm regions and seasons its ease of use, speed and accuracy make it highly preferable for spreading lawn care products, particularly for non-professionals such as homeowners.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A particulate material broadcasting/dispersing skirt and baffle spreader, the spreader comprising:

a storage hopper defined by a receiving inner volume and forming an inlet aperture;

a broadcasting/dispersing skirt adjacent to, and in communication with the storage hopper, the broadcast skirt being defined by a dispersing inner volume having an upper region and a lower region, the lower region terminating at an outlet edge forming an outlet aperture;

multiple upper layer baffles traversing the upper region of the broadcasting/dispersing skirt, the upper layer baffles being disposed coplanar to each other, the upper layer baffles forming an upper gap between each adjacent pair of the upper layer baffles;

multiple lower layer baffles traversing the lower region of the broadcasting/dispersing skirt, the lower layer baffles being disposed coplanar to each other, the lower layer baffles further being disposed in parallel, offset relationship from the upper layer baffles, the lower layer baffles forming a lower gap between each adjacent pair of the lower layer baffles; and
multiple vertical deflector vanes disposed in a spaced-apart relationship from the lower layer baffles, the vertical deflector vanes being oriented perpendicular to the lower layer baffles.

2. The spreader of claim 1, wherein the storage hopper has an inverted pyramidal shape and the broadcast skirt has a pyramidal shape.

3. The spreader of claim 2, wherein the inlet aperture is sized and dimensioned to enable passage of a particulate material into the receiving inner volume.

4. The spreader of claim 3, wherein the outlet aperture is sized and dimensioned to enable passage of the particulate material.

5. The spreader of claim 4, wherein the upper layer baffles are defined by an elongated V-shape having an upper peak and an upper surface area.

6. The spreader of claim 5, wherein the lower layer baffles are defined by an elongated V-shape having a lower peak and a lower surface area.

7. The spreader of claim 6, wherein the particulate material introduced into the dispersing inner volume of the broadcasting/dispersing skirt strikes the upper peak and the upper surface area of the upper layer baffles, and further, the particulate material striking the upper peak and the upper surface area of the upper layer baffles passes through the upper gap.

8. The spreader of claim 7, wherein the particulate material passing through the upper gap strikes the lower peak and the lower surface area of the lower layer baffles, and further, the particulate material striking the lower peak and the lower surface area of the lower layer baffles passes through the lower gap.

9. The spreader of claim 8, wherein at least a portion of the particulate material passing through the lower gap strikes the vertical deflector vanes and the outlet edge of the broadcasting/dispersing skirt.

10. The spreader of claim 9, wherein the particulate material striking the deflector vanes and the outlet edge disperses through the outlet aperture in a close pattern coverage area.

11. The spreader of claim 10, wherein the particulate material includes at least one of the following: rock salt, ice melting particulates, fertilizer, and seeds.

12. The spreader of claim 11, further comprising a pair of handles joined with the spreader.

13. The spreader of claim 12, further comprising a broadcasting mechanism operatively attached to, and in communication with the spreader and the broadcasting/dispersing skirt.

14. The spreader of claim 13, further comprising a velocity switch operatively connected to the spreader, the velocity switch regulating discharge velocity of the particulate material.

15. The spreader of claim 1, wherein the upper and lower layer baffles are angled between about 60° and 110°.

16. The spreader of claim 15, wherein the width of the upper and lower layer baffles is about 0.75 inches to 1.5 inches.

17. The spreader of claim 16, wherein the spacing between each upper layer baffle and each lower level baffle is about 75 percent of the width of the baffles.

18. The spreader of claim 1, further comprising a volume dial to control the amount of particulate material that is emitted from the storage hopper into the broadcasting/dispersing skirt.

19. A particulate material broadcasting/dispersing skirt and baffle spreader, the spreader comprising:
a storage hopper defined by a receiving inner volume and forming an inlet aperture sized and dimensioned to enable passage of a particulate material into the receiving inner volume;
a pair of handles joined with the spreader;
a broadcasting/dispersing skirt adjacent to, and in communication with the spreader, the broadcasting/dispersing skirt being defined by a dispersing inner volume having an upper region and a lower region, the lower region terminating at an outlet edge forming an outlet aperture sized and dimensioned to enable passage of the particulate material;
a broadcasting mechanism operatively attached to, and in communication with the storage hopper and the broadcasting/dispersing skirt;
multiple elongated upper layer baffles traversing the upper region of the broadcasting/dispersing skirt, the upper layer baffles being disposed coplanar to each other, the upper layer baffles forming an upper gap between each adjacent pair of the upper layer baffles, the upper layer baffles being defined by a V-shape having an upper peak and an upper surface area;
multiple elongated lower layer baffles traversing the lower region of the broadcasting/dispersing skirt, the lower layer baffles being disposed coplanar to each other, the lower layer baffles further being disposed in parallel, offset relationship from the upper layer baffles, the lower layer baffles forming a lower gap between each adjacent pair of the lower layer baffles, the lower layer baffles being defined by a V-shape having a lower peak and a lower surface area;
multiple vertical deflector vanes disposed in a spaced-apart relationship from the lower layer baffles, the deflector vanes being oriented perpendicular to the lower layer baffles;
whereby the particulate material introduced into the dispersing inner volume of the broadcasting/dispersing skirt strikes the upper peak and the upper surface area of the upper layer baffles, and further, the particulate material striking the upper peak and the upper surface area of the upper layer baffles passes through the upper gap;
whereby the particulate material passing through the upper gap strikes the lower peak and the lower surface area of the lower layer baffles, and further, the particulate material striking the lower peak and the lower surface area of the lower layer baffles passes through the lower gap;
whereby at least a portion of the particulate material passing through the lower gap strikes the vertical deflector vanes and the outlet edge of the broadcasting/dispersing skirt,
whereby the particulate material striking the deflector vanes and the outlet edge disperses through the outlet aperture in a close pattern coverage area,
wherein the upper and lower layer baffles are angled between about 60° and 110°; wherein the width of the upper and lower layer baffles is about 0.75 inches to 1.5 inches; wherein the spacing between each upper layer baffle and each lower level baffle is about 75 percent of the width of the baffle; and
a velocity switch operatively connected to the spreader, the velocity switch regulating discharge velocity of the particulate material.

20. A particulate material broadcasting/dispersing skirt and baffle spreader, the spreader consisting of:
- a storage hopper defined by a receiving inner volume and forming an inlet aperture sized and dimensioned to enable passage of a particulate material into the receiving inner volume, the storage hopper having an inverted pyramidal shape;
- a lid removably covering the inlet aperture of storage hopper;
- a pair of handles joined with the spreader;
- a broadcasting/dispersing skirt adjacent to, and in communication with the conventional spreader, the broadcasting/dispersing skirt being defined by a dispersing inner volume having an upper region and a lower region, the lower region terminating at an outlet edge forming an outlet aperture sized and dimensioned to enable passage of the particulate material, the broadcasting/dispersing skirt having a pyramidal shape;
- a broadcasting mechanism operatively attached to, and in communication with the storage hopper and the broadcasting/dispersing skirt;
- a velocity switch operatively connected to the conventional spreader, the velocity switch regulating discharge velocity of the particulate material;
- a volume dial to control the amount of particulate material that is emitted from the storage hopper into the broadcasting/dispersing skirt;
- a power switch;
- multiple elongated upper layer baffles traversing the upper region of the broadcasting/dispersing skirt, the upper layer baffles being disposed coplanar to each other, the upper layer baffles forming an upper gap between each adjacent pair of the upper layer baffles, the upper layer baffles being defined by a V-shape having an upper peak and an upper surface area;
- multiple elongated lower layer baffles traversing the lower region of the broadcasting/dispersing skirt, the lower layer baffles being disposed coplanar to each other, the lower layer baffles further being disposed in parallel, offset relationship from the upper layer baffles, the lower layer baffles forming a lower gap between each adjacent pair of the lower layer baffles, the lower layer baffles being defined by a V-shape having a lower peak and a lower surface area;
- multiple vertical deflector vanes disposed in a spaced-apart relationship from the lower layer baffles, the deflector vanes being oriented perpendicular to the lower layer baffles;
- whereby the particulate material introduced into the dispersing inner volume of the broadcasting/dispersing skirt strikes the upper peak and the upper surface area of the upper layer baffles, and further, the particulate material striking the upper peak and the upper surface area of the upper layer baffles passes through the upper gap;
- whereby the particulate material passing through the upper gap strikes the lower peak and the lower surface area of the lower layer baffles, and further, the particulate material striking the lower peak and the lower surface area of the lower layer baffles passes through the lower gap;
- whereby at least a portion of the particulate material passing through the lower gap strikes the vertical deflector vanes and the outlet edge of the broadcasting/dispersing skirt;
- whereby the particulate material striking the deflector vanes and the outlet edge disperses through the outlet aperture in a close pattern coverage area;
- wherein the upper and lower layer baffles are angled between about 60° and 110°;
- wherein the width of the upper and lower layer baffles is about 0.75 inches to 1.5 inches; and
- wherein the spacing between each upper layer baffle and each lower level baffle is about 75 percent of the width of the baffle.

* * * * *